US009786172B2

(12) United States Patent
Takahara et al.

(10) Patent No.: US 9,786,172 B2
(45) Date of Patent: Oct. 10, 2017

(54) WARNING GUIDANCE SYSTEM, METHOD, AND PROGRAM THAT PROVIDE INFORMATION TO VEHICLE NAVIGATION SYSTEMS

(71) Applicant: AISIN AW CO., LTD., Anjo-shi, Aichi-ken (JP)

(72) Inventors: Masatoshi Takahara, Okazaki (JP); Hirohiko Goto, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/112,876

(22) PCT Filed: Jan. 14, 2015

(86) PCT No.: PCT/JP2015/050741
§ 371 (c)(1),
(2) Date: Jul. 20, 2016

(87) PCT Pub. No.: WO2015/125516
PCT Pub. Date: Aug. 27, 2015

(65) Prior Publication Data
US 2016/0351050 A1    Dec. 1, 2016

(30) Foreign Application Priority Data

Feb. 20, 2014    (JP) ................. 2014-030520

(51) Int. Cl.
*G08G 1/0968*    (2006.01)
*G07C 5/08*    (2006.01)
(Continued)

(52) U.S. Cl.
CPC ........... *G08G 1/0968* (2013.01); *B60W 30/12* (2013.01); *G01C 21/3697* (2013.01);
(Continued)

(58) Field of Classification Search
CPC ........... G08G 1/0968; G08G 1/096716; G08G 1/09675; G08G 1/096791; G08G 1/162;
(Continued)

(56) References Cited

U.S. PATENT DOCUMENTS

2004/0068364 A1* 4/2004 Zhao ................. G01C 21/3492
701/468
2009/0005929 A1 1/2009 Nakao et al.
(Continued)

FOREIGN PATENT DOCUMENTS

EP    2124212 A1    11/2009
JP    2002-279577 A    9/2002
(Continued)

OTHER PUBLICATIONS

Dec. 16, 2016 Supplementary Search Report issued in European Patent Application No. EP 15752359.8.
(Continued)

*Primary Examiner* — Marthe Marc-Coleman
(74) *Attorney, Agent, or Firm* — Oliff PLC

(57) ABSTRACT

Warning guidance systems, methods, and programs communicate with a vehicle navigation system to provide guidance on a warning event that may occur on the vehicle. The systems, methods, and programs acquire warning event information indicating the warning event and an event vehicle on which the warning event has occurred. The systems methods and programs transmit the guidance to the vehicle traveling in a predetermined section in a case in which the warning event that has occurred a plurality of times in the predetermined section has occurred on a plurality of event vehicles, but do not transmit the guidance at another vehicle traveling in the predetermined section in a case in which the warning event that has occurred a plurality of times in the predetermined section has occurred on a single event vehicle for all of the plurality of times.

7 Claims, 3 Drawing Sheets

(51) Int. Cl.
*G08G 1/0967* (2006.01)
*G08G 1/16* (2006.01)
*H04W 4/02* (2009.01)
*B60W 30/12* (2006.01)
*G01C 21/36* (2006.01)
*G08G 1/017* (2006.01)

(52) U.S. Cl.
CPC ........... *G07C 5/085* (2013.01); *G07C 5/0816* (2013.01); *G08G 1/09675* (2013.01); *G08G 1/096716* (2013.01); *G08G 1/096791* (2013.01); *G08G 1/162* (2013.01); *H04W 4/023* (2013.01); *H04W 4/028* (2013.01); *B60W 2550/148* (2013.01); *G08G 1/017* (2013.01)

(58) Field of Classification Search
CPC ................. G08G 1/017; B60W 30/12; B60W 2550/148; G01C 21/3697; G07C 5/0816; G07C 5/085; H04W 4/023; H04W 4/028
USPC ..... 701/29.6, 117, 33.4, 423, 301, 410, 533; 709/206
See application file for complete search history.

(56) References Cited

U.S. PATENT DOCUMENTS

2010/0250106 A1   9/2010   Bai et al.
2011/0173279 A1   7/2011   Janke
2013/0282271 A1   10/2013  Rubin et al.

FOREIGN PATENT DOCUMENTS

| JP | 2009/006946 A | 1/2009 |
| JP | 2010-237794 A | 10/2010 |
| JP | 2011-146064 A | 7/2011 |
| JP | 2014-010461 A | 1/2014 |

OTHER PUBLICATIONS

Apr. 15, 2010 Search Report issued in International Patent Application No. PCT/JP2015/050741.

\* cited by examiner

FIG. 1
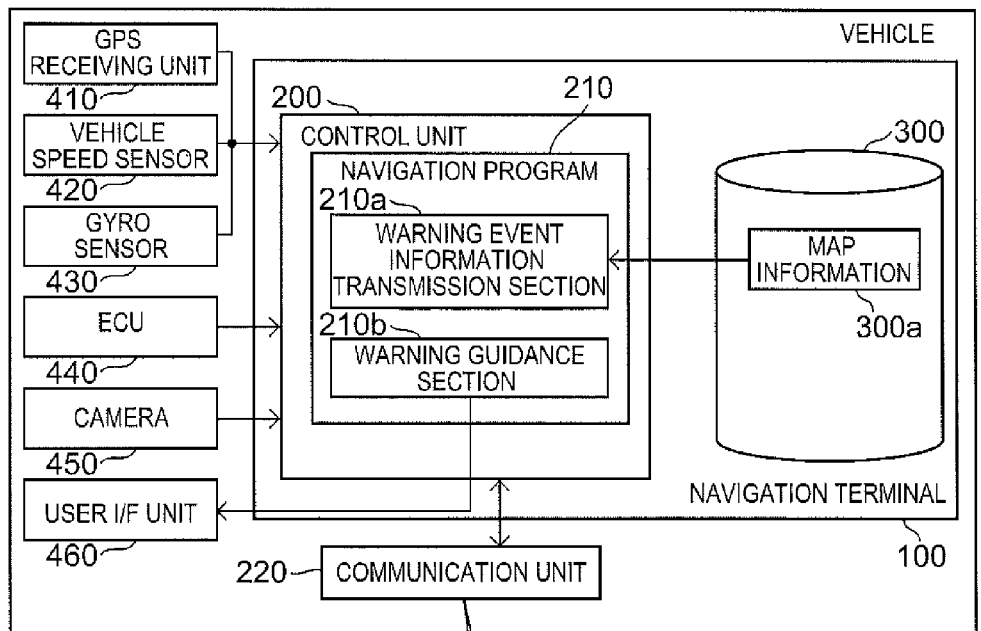
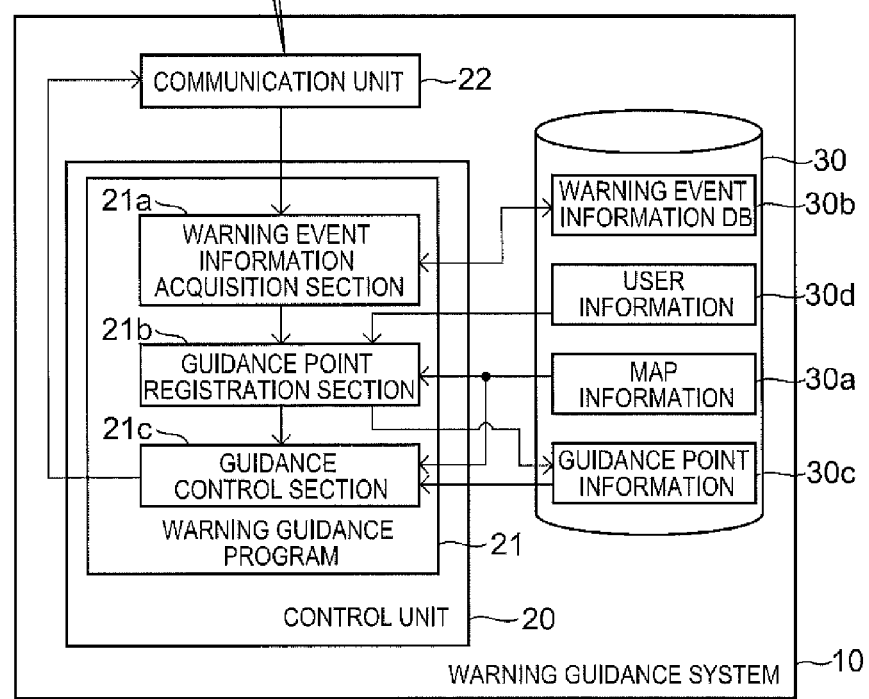

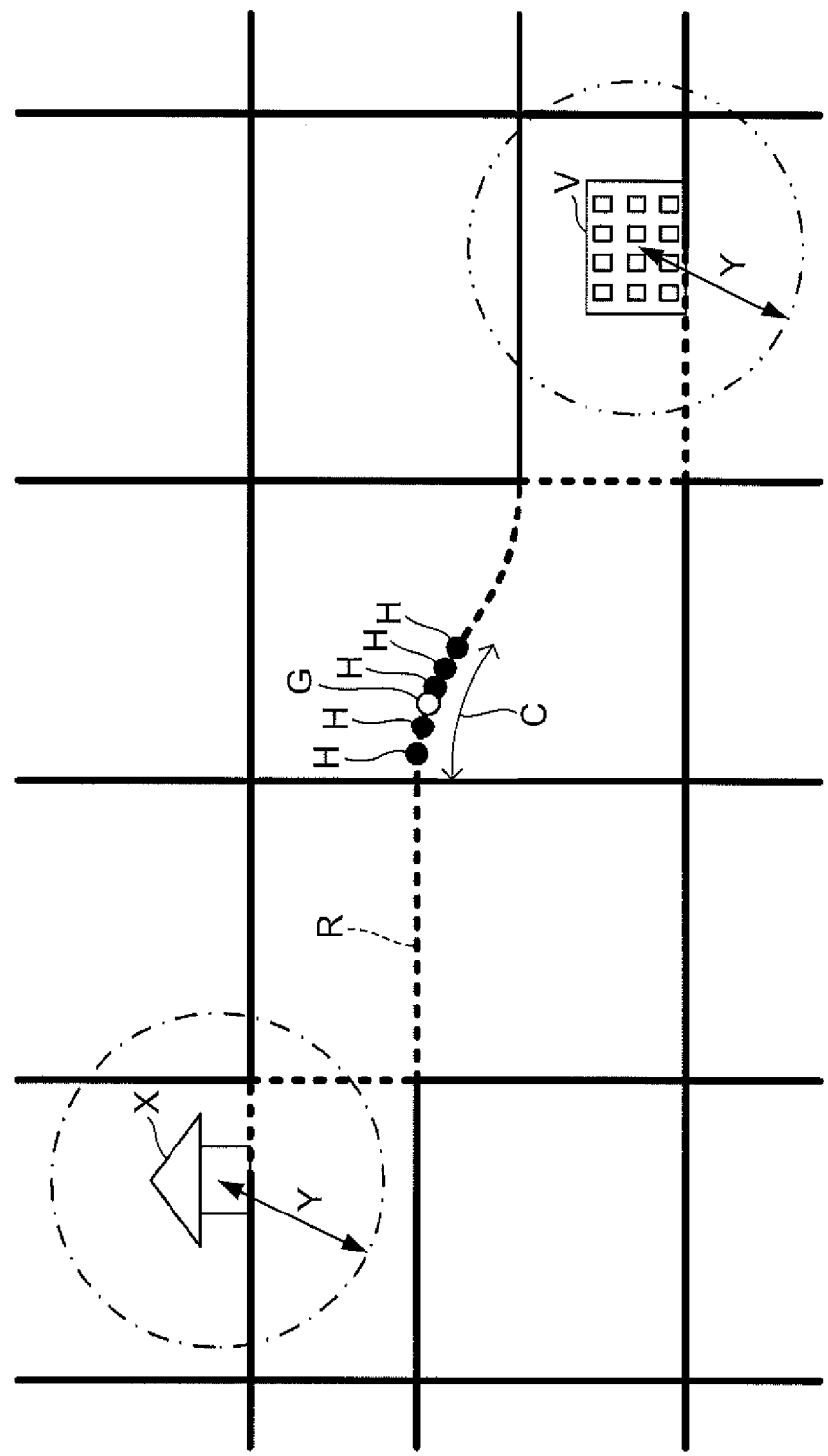

WARNING GUIDANCE SYSTEM, METHOD, AND PROGRAM THAT PROVIDE INFORMATION TO VEHICLE NAVIGATION SYSTEMS

TECHNICAL FIELD

Related technical fields include a warning guidance system, method, and program that provide guidance on a warning event to vehicle navigation systems.

BACKGROUND ART

An information processing system is known, which receives slip detection information from a vehicle and monitors the number of vehicles and vehicle types of the vehicles on which a slip was detected (Japanese Patent Application Publication No. 2011-146064 (JP 2011-146064A)). In JP 2011-146064A, in a case in which the number of the vehicles on which a slip was detected in a target area exceeds a predetermined value, it is recognized that the target area is in a road condition where a slip is likely to occur and a warning is provided to a driver of a vehicle passing through the target area.

SUMMARY

However, in a case in which a slip has occurred on vehicles of a certain vehicle type, it cannot be determined that the area is in the road condition where a slip is likely to occur also on vehicles of other vehicle types. In such a case, there is a problem that guidance on slippery road condition may be unnecessarily provided to the vehicles of other vehicle types although a slip does not occur on the vehicles of other vehicle types.

In light of the aforementioned problem, exemplary embodiments of the broad inventive principles herein provide a technology that is capable of preventing guidance from being unnecessarily provided.

Exemplary embodiments provide a warning guidance system, method, and program for providing, at a vehicle, guidance on a warning event that may occur on the vehicle. Exemplary embodiments acquire warning event information indicating the warning event and an event vehicle on which the warning event has occurred and transmit the guidance to the vehicle traveling in a predetermined section in a case in which the warning event that has occurred a plurality of times in the predetermined section has occurred on a plurality of event vehicles, and do not transmit the guidance to another vehicle traveling in the predetermined section in a case in which the warning event that has occurred a plurality of times in the predetermined section has occurred on a single event vehicle for all of the plurality of times.

In the above warning guidance system, method, and program, in a case in which the warning event that has occurred a plurality of times in the predetermined section has occurred on a single event vehicle for all of the plurality of times, it is difficult to say that the warning event is likely to occur on the vehicle. Consequently, by controlling not to provide the guidance to the vehicle on which the warning event is not likely to occur, it is possible to prevent the guidance from being unnecessarily provided.

BRIEF DESCRIPTION OF THE DRAWINGS

FIG. 1 is a block diagram of a warning guidance system.
FIG. 2 is a map on which occurrence points are allocated.

DETAILED DESCRIPTION OF EXEMPLARY EMBODIMENT

Figure 3C:
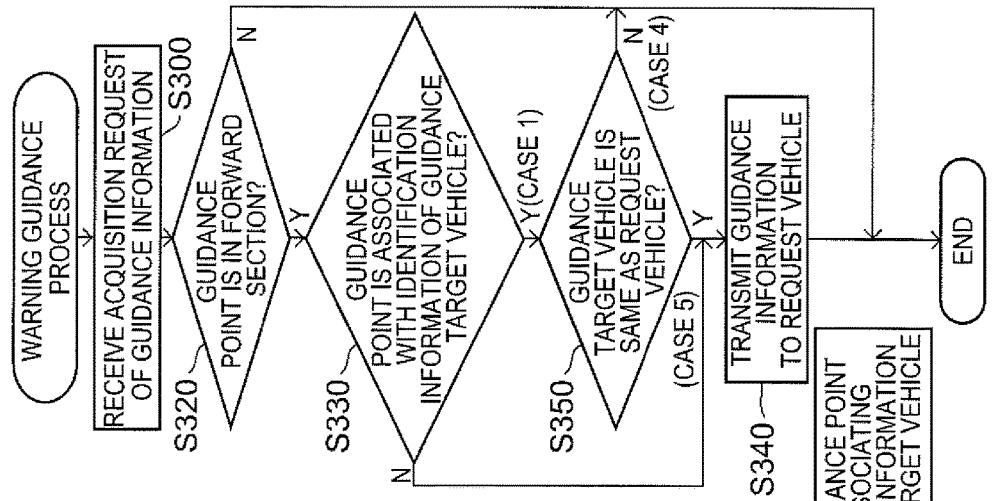
FIG. 3C is a flow chart of a warning guidance process.

Here, an embodiment will be explained in the following order.
(1) Configuration of warning guidance system:
(1-1) Configuration of navigation terminal:
(1-2) Configuration of warning guidance system:
(2) Warning event information transmission process:
(3) Guidance point registration process:
(4) Warning guidance process:
(5) Other embodiments:

(1) Configuration of Warning Guidance System

FIG. 1 is a block diagram of a warning guidance system according to the present embodiment. A warning guidance system 10 according to the present embodiment cooperates with a navigation terminal 100 provided in a vehicle.
(1-1) Configuration of Navigation Terminal:

The navigation terminal 100 is mounted on a plurality of vehicles traveling on roads. The navigation terminal 100 is provided with a control unit 200 including a CPU and storage media (e.g., a RAM, a ROM, etc.) and a storage medium 300. (As used herein the terms "storage media" and "storage medium" are not intended to encompass transitory signals.) The control unit 200 executes programs stored in the storage medium 300 and the ROM. The control unit 200 in the present embodiment executes a navigation program 210 as one of the programs.

The vehicle is provided with a communication unit 220, a GPS receiving unit 410, a vehicle speed sensor 420, a gyro sensor 430, an Electronic Control Unit (ECU) 440, a camera 450, and a user I/F unit 460. The communication unit 220 is configured as a circuit for performing radio communication. The control unit 200 controls the communication unit 220 to perform communication with the warning guidance system 10. The GPS receiving unit 410 receives electronic waves from a GPS satellite and outputs signals for calculating a current position of the vehicle through an interface (not shown) to the control unit 200. The vehicle speed sensor 420 outputs signals corresponding to a rotation speed of the wheels provided on the vehicle. The control unit 200 acquires these signals through an interface (not shown) to acquire the vehicle speed. The gyro sensor 430 detects angular acceleration for a turn in a horizontal plane of the vehicle and outputs signals corresponding to the direction of the vehicle. The control unit 200 acquires these signals to acquire a travel direction of the vehicle.

The storage medium 300 stores map information 300*a*. The map information 300*a* includes node data indicating positions, etc. of nodes (intersections) set to roads to be traveled by the vehicle, shape interpolating point data indicating positions, etc. of shape interpolating points for determining shapes of road sections between nodes, link data indicating various kinds of information for road sections, etc. The link data indicates a link direction that is a direction to be traveled by the vehicle in the road section. In addition, the link data is associated with feature information indicating positions of various kinds of features provided in a road section corresponding to a link. Various kinds of features include temporary stop lines, traffic signals, rail crossings, etc.

The control unit 200 acquires travel history of the vehicle based on output signals of the vehicle speed sensor 420, the gyro sensor 430, the GPS receiving unit 410, etc. and acquires shapes of road sections based on the node data and the link data of the map information 300a. The control unit 200 determines a road section with a shape that matches the travel history of the vehicle as a travel road section on which the vehicle is traveling and determines the current position of the vehicle on the travel road section.

The ECU 440 is a circuit for controlling the vehicle. The ECU 440 according to the present embodiment acquires signals indicating an amount of pressing of a brake pedal from a brake control circuit. In addition, the vehicle is provided with a Traction Control System (TCS), Electronic Stability Control (ESC), and Antilock Brake System (ABS) as behavior stabilizing devices (not shown) and the ECU 440 acquires signals indicating whether these behavior stabilizing devices have been activated. In addition, the vehicle is provided with a suspension (not shown) and acquires signals indicating an amount of expansion/contraction of the suspension. Various kinds of signals acquired by the ECU 440 are output to a control unit 20.

The camera 450 is an image sensor that captures an image of a road surface ahead of the vehicle. The control unit 200 executes a known template matching with respect to the image captured by the camera 450 to determine presence or absence of an obstacle ahead of the vehicle. In addition, the control unit 200 executes a known line recognition process with respect to the image captured by the camera 450 to acquire a positional relation between a compartment line formed on the road surface and the vehicle. The compartment line is a line to mark an edge of a road and an edge of a lane on the road surface. The control unit 20 determines whether the vehicle travels across the compartment line based on the positional relation between the vehicle and the compartment line.

The user I/F unit 460 is an interface part for inputting an instruction of a driver and supplying various kinds information to the driver, and provided with a display part combined with an input part formed by a touch panel display (not shown) and an output part for output sound such as a speaker, etc. The control unit 200 is capable of displaying the current position of the vehicle and a map of a vicinity of the current position on the user IN unit 460 by a function of the navigation program 210. That is, the control unit 200 acquires the current position of the vehicle and creates an image showing a map of the vicinity of the current position based on the map information 300a to output to the user I/F unit 460. As a result, the display part of the user I/F unit 460 displays the map including the current position.

The navigation program 210 includes a warning event information transmission section 210a and a warning guidance section 210b. The warning event information transmission section 210a is a module that causes the control unit 200 to realize a function of transmitting to the warning guidance system 10 warning event information indicating a warning event (content of the warning event) and a vehicle (identification information of the vehicle) in a case in which the warning event has occurred on the vehicle. Hereinafter, the vehicle that transmits the warning event information, that is, the vehicle on which the warning event has occurred may be referred especially to as an event vehicle. The identification information of the event vehicle is a string of letters/numbers particular to each vehicle. For example, the identification information may be the production number of the navigation terminal 100, the production number of the vehicle, a user ID of the driver, etc.

The control unit 200 detects a warning event based on signals output from the respective sensors 410 to 450 and the ECU 440. In the present embodiment, the control unit 20 detects "slip," "wobble," "difference in level," "restriction oversight," "sudden deceleration," and "hazardous curve" as the warning event.

The slip corresponds that any one of the behavior stabilization devices (TCS, ESC, ABS) has been activated.

The "wobble" corresponds that the distance between a vehicle and a compartment line becomes unstable on a straight travel road section. Specifically, the wobble corresponds that a state in which a vehicle travels across a compartment line and a state in which the vehicle does not travel across the compartment line is repeated more than a predetermined number of times. The straight travel road section corresponds to a travel road section whose curvature radius is greater than or equal to a threshold value and that a radius of an approximate circle that is approximate to shape interpolating points is greater than or equal to a threshold value.

The "difference in level" corresponds that the amount of expansion or the amount of contraction of the suspension is greater than or equal to a threshold value.

The "restriction oversight" corresponds that the vehicle speed in front of a temporary stop line or a stop restriction point of a rail crossing, etc. is greater than or equal to a threshold value. The control unit 200 may detect the restriction oversight in a case in which the vehicle speed at a point by a predetermined distance (for example, 20 m) in front of the stop point is greater than or equal to a threshold value (for example, 40 km).

The "sudden deceleration" corresponds that the amount of pressing of brake pedal is greater than or equal to a threshold value.

The "hazardous curve" corresponds that a vehicle travels across a compartment line on a curvilinear travel road section. The curvilinear travel road section corresponds to a travel road section whose curvature radius is less than a threshold value and that a radius of an approximate circle that is approximate to shape interpolating points is less than a threshold value.

When the control unit 20 detects the warning event as explained above with the function of the warning event information transmission section 210a, the control unit 20 acquires, as an occurrence point, the current position at an occurrence time when the warning event was detected. The control unit 20 creates warning event information indicating the content of the warning event, the occurrence point, the occurrence time, and identification information of a host vehicle (the event vehicle on which the warning event has occurred) and transmits the warning event information to the warning guidance system 10. Thereby, the warning event information is transmitted to the warning guidance system 10 via the communication unit 220. Although not shown, the warning event information is transmitted to the warning guidance system 10 from a large number of vehicles; thereby the warning guidance system 10 is capable of collecting the warning event information.

The control unit 200 provides guidance based on the guidance information transmitted from the warning guidance system 10 with the function of the warning guidance section 210b. The control unit 200, with the function of the warning guidance section 210b, transmits an acquisition request of the guidance information to the warning guidance system 10. To the acquisition request, the identification information of the vehicle that has transmitted the acquisition request as well as information indicating the travel road section in which the vehicle is traveling and the current position is attached. The warning guidance system 10, in response to the acquisition request, transmits the guidance information on a section ahead of the current position in the travel road section to the navigation terminal 100. The control unit 200, with the function of the warning guidance section 210b, outputs an audio message of the guidance using the speaker of the user I/F unit 460 based on the guidance information. Hereinafter, the vehicle that has transmitted the acquisition request of guidance information, that is, the vehicle on which the guidance is provided may be referred to as a request vehicle.

(1-2) Configuration of Warning Guidance System:

Subsequently, the warning guidance system 10 is explained.

The warning guidance system 10 is configured to perform, at a request vehicle, guidance on a warning event that may occur on the request vehicle. To that end, the warning guidance system 10 is provided with the control unit 20 including a CPU, a RAM, a ROM, etc., a communication unit 22, and a storage medium 30. The control unit 20 executes programs stored in the storage medium 30 and the ROM. The communication unit 22 is configured by a circuit that performs radio communication. The control unit 20 controls the communication unit 22 to perform communication with the vehicle. The control unit 20 executes a warning guidance program 21.

The storage medium 30 stores map information 30a. The map information 30a is the same as the map information 300a of the navigation terminal 100. In addition, the storage medium 30 stores warning event information DB (database) 30b. The warning event information DB 30b is data in which the warning event information indicating the content of the warning event, the occurrence point, the occurrence time, and the identification information of the event vehicle on which the warning event has occurred is accumulated. The warning event information DB 30b accumulates the warning event information transmitted from a plurality of event vehicles.

The storage medium 30 stores guidance point information 30c. The guidance point information 30c is a database in which a guidance target vehicle and a guidance content are registered for each guidance point. The guidance point is a point at which the guidance on a warning event is provided. The guidance on the warning event is provided when a request vehicle travels by a predetermined distance in front of the guidance point. The guidance target vehicle is a request vehicle that will be target for the guidance on the warning event to be provided when the guidance target vehicle travels by a predetermined distance in front of the guidance point. At the guidance point associated with the identification information of the guidance target vehicle in the guidance point information 30c, the guidance on the warning event is provided only at the request vehicle corresponding to the identification information. At the guidance point not associated with the identification information of the guidance target vehicle in the guidance point information 30c, the guidance on the warning event is provided at all of the request vehicles. The guidance content corresponds to a content of an audio message that is caused to be output by the user I/F unit 460 of the request vehicle, and a content of the audio message for notifying that the warning event is likely to occur at the guidance point and for providing guidance on a drive operation to prevent the warning event.

The storage medium 30 stores user information 30d. The user information 30d is a database in which, for each vehicle capable of communicating with the warning guidance system 10, the identification information of the vehicle, the position of the home of the driver of the vehicle, the position of the work location of the driver of the vehicle, and routes frequently traveled by the vehicle are stored. The routes frequently traveled by the vehicle corresponds to routes along which the vehicle has traveled more than a predetermined time (for example, 10 times), which the control unit 200 of the navigation terminal 100 can acquire by analyzing tracks of the current position of the vehicle. When the navigation terminal 100 acquires a route frequently traveled by the vehicle, associates the information indicating the route frequently traveled by the vehicle with the identification information of the vehicle, and transmits the information to the warning guidance system 10. Thereby, the control unit 20 of the warning guidance system 10 stores the route frequently traveled by the vehicle in the user information 30d. In addition, the control unit 20 of the warning guidance system 10, in an initial registration process to enable the navigation terminal 100 to use service of the warning guidance system 10, receives registration information indicating the identification information of the vehicle, the position of the home of the driver of the vehicle, the position of the work location of the driver of the vehicle from the navigation terminal 100 and stores the content of the registration information in the user information 30d.

The warning guidance program 21 includes warning event information acquisition section 21a, guidance point registration section 21b, and guidance control section 21c.

The warning event information acquisition section 21a is a module that causes the control unit 20 to realize a function of acquiring the warning event information indicating the warning event and the event vehicle on which the warning event has occurred. That is, the control unit 20, with the function of the warning event information acquisition section 21a, acquires the warning event information accumulated in the warning event information DB 30b.

The guidance point registration section 21b is a module that causes the control unit 20 to realize the function of registering the guidance point in association with the guidance target vehicle in the guidance point information 30c. The control unit 20, with the function of the guidance point registration section 21b, allocates the occurrence points of the warning event indicated by the warning event information accumulated in the warning event information DB 30b on the map indicated by the map information 30a and acquires a concentrated section of the occurrence points. The concentrated section of the occurrence points is a part of a section of a road section indicated by link data of the map information 30a and a section in which a plurality of occurrence points are concentrated more than a predetermined criterion. In the present embodiment, the control unit 20 divides a road section into a plurality of unit sections with a predetermined length (for example, 50 m) and acquires, as the concentrated section, the unit section in which the number of times of occurrence of the warning event with the same content is greater than or equal to a threshold value (for example, five times). A same warning event is the warning event with the same content. For example, the unit section in which the slip as the warning event has occurred five times becomes the concentrated section. However, the unit section in which the slip as the warning event has occurred three times and the sudden deceleration has occurred three times does not become the concentrated section. Note that the number of times of occurrence of the warning event can be determined based on the number of occurrence points existing in the unit section.

FIG. 2 is a map in which occurrence points H are allocated. In the same figure, a concentrated section C in which the occurrence points H (black circle) of the warning event with the same content are concentrated is shown. The control unit 20, with the function of the guidance point registration section 21b, registers a representative point (for example a point of an average position) of the occurrence points H in the concentrated section C as a guidance point G (white circle) in the guidance point information 30c. In addition, the control unit 20 acquires the content of the warning event whose number of times of occurrence in the concentrated section C is greater than or equal to a threshold value and registers the guidance point G in association with guidance content (audio message) corresponding to the content of the warning event in the guidance point information 30c.

As explained above, in the concentrated section C in which the warning event with the same content has occurred the threshold value of times or more, the guidance point G is set and the guidance content corresponding to the warning event is registered in association with the guidance point G in the guidance point information 30c. The control unit 20, with the function of the guidance point registration section 21b, executes a process for associating the identification information of the guidance target vehicle with the guidance point G according to the conditions shown in the following Table 1. Table 1 shows the conditions for a case in which the identification information of the guidance target vehicle is associated with the guidance point G and a case in which the identification information of the guidance target vehicle is not associated with the guidance point G.

occurred the threshold value of times or more in the concentrated section C and determines whether all pieces of the identification information is the same. That is, the control unit 20 determines whether the warning event that has occurred a plurality of times (greater than or equal to the threshold value) in the predetermined section (the concentrated section) has occurred on a single event vehicle.

In a case in which it is determined that the warning event with the same content that has occurred the threshold value of times or more in the concentrated section C has occurred on the single event vehicle for all of the times, the control unit 20, with the function of the guidance point registration section 21b, determines whether the concentrated section C is within a predetermined distance (for example, 1 km) from the driver's home or work location of the single event vehicle or on a frequently traveled route. Note that the control unit 20 is capable of acquiring the driver's home or work location of the event vehicle and the frequently traveled route of the event vehicle from the user information 30d.

In a case in which it is determined that the guidance point G is within the predetermined distance from the driver's home or work location of the single event vehicle or on the frequently traveled route, the control unit 20 sets the single event vehicle as the guidance target vehicle and registers the guidance point G in association with the identification information of the guidance target vehicle in the guidance point information 30c (Case 1 in Table 1).

On the other hand, in a case in which it is not determined that the warning event with the same content that has occurred the threshold value of times or more in the concentrated section C has occurred on the single event vehicle for all of the times, that is, in a case in which the same warning event has occurred on a plurality of event vehicles, the control unit 20, with the function of the guidance point registration section 21b, registers the guidance point G in the

TABLE 1

| | Guidance point registration process | | Guidance control process | |
| --- | --- | --- | --- | --- |
| Event vehicle on which warning event has occurred times of threshold value or more in concentrated section | Position of guidance point (concentrated section) | Identification information of guidance target vehicle | Guidance target vehicle and request vehicle | Transmission of guidance information to request vehicle |
| Single (Identification information of guidance target vehicle is associated with guidance point.) | Within predetermined distance from driver's home or work location of guidance target vehicle or on frequently traveled route | To be associated with guidance point (Case 1) | Different (Case 4) | No |
| | | | Same (Case 5) | Yes |
| | Neither within predetermined distance from driver's home or work loaction of guidance target vehicle nor on frequently traveled route | Not to be associated with guidance point (Case 3) | Any | Yes |
| Plural (Identification information of guidance target vehicle is not associated with guidance point.) | Any | Not to be associated with guidance point (Case 2) | Any | Yes |

Hereinafter, a process for associating the identification information of the guidance target vehicle with the guidance point G is explained. Initially, the control unit 20, with the function of the guidance point registration section 21b, determines whether the warning event with the same content that has occurred the threshold value of times or more in the concentrated section C has occurred on a single event vehicle for all of the times. Specifically, the control unit 20 acquires the identification information of the event vehicles on which the warning event with the same content has guidance point information 30c without associating the identification information of the guidance target vehicle (Case 2 in Table 1). In addition, in a case in which it is determined that the warning event with the same content that has occurred the threshold value of times or more in the concentrated section C has occurred on the single event vehicle for all of the times, but the concentrated section C is not within the predetermined distance from the driver's home of the single event vehicle, not within the predetermined distance from the driver's work location of the single event vehicle, and not on the frequently traveled route, the control unit 20, with the function of the guidance point registration section 21b, registers the guidance point G in the guidance point information 30c without associating the identification information of the guidance target vehicle (Case 3 in Table 1).

In FIG. 2, road sections are shown by thick line, and among the road sections, the road sections on a frequently traveled route R are shown by thick dashed line. In FIG. 2, an area (inside dashed double-dotted line) within a predetermined distance Y from each of a driver's home X and work location V of the single event vehicle on which the warning event with the same content has occurred in the concentrated section C for all of the times is shown and the guidance point G is not inside the area. However, the guidance point G is on the route R frequently traveled by the single event vehicle on which the warning event with the same content has occurred in the concentrated section C for all of the times. This guidance point G corresponds to Case 1 in Table 1 and the guidance point G is associated with the identification information of the guidance target vehicle.

The guidance control section 21c is a module that causes the control unit 20 to realize, in a case in which the warning event that has occurred a plurality of times in the predetermined section has occurred on a plurality of event vehicles, a function of controlling to provide guidance at a request vehicle traveling in the predetermined section and, in a case in which the warning event that has occurred a plurality of times in the predetermined section has occurred on a single event vehicle for all of the plurality of times, a function of controlling not to provide the guidance at another request vehicle traveling in the predetermined section. In addition, the control unit 20, with the function of the guidance control section 21c, controls not to provide the guidance at another vehicle traveling in the predetermined section in a case in which the warning event that has occurred a plurality of times in the predetermined section has occurred on the single event vehicle for all of the plurality of times and the predetermined section is within the predetermined distance Y from the driver's home X or work location V of the single event vehicle. In addition, the control unit 20, with the function of the guidance control section 21c, controls not to provide the guidance at another vehicle traveling in the predetermined section in a case in which the warning event that has occurred a plurality of times in the predetermined section has occurred on the single event vehicle for all of the plurality of times and the predetermined section is on the route R that was traveled by the single event vehicle a predetermined number of times or more in the past.

Here, the predetermined section corresponds to the concentrated section C. The case in which the warning event that has occurred a plurality of times has occurred on the single event vehicle for all of the plurality of times corresponds to a case in which the warning event with the same content that has occurred a threshold value of times or more in the concentrated section C has occurred on the single event vehicle for all of the times. On the other hand, the case in which the warning event has occurred a plurality of times on a plurality of event vehicles corresponds to a case in which the warning event with the same content that has occurred the threshold value of times or more in the concentrated section C has occurred on the plurality of event vehicles. Further, the request vehicle traveling in the predetermined section corresponds to a request vehicle traveling in front of the guidance point G. That is, the control unit 20, with the function of the guidance control section 21c, in a case in which the request vehicle travels in front of the guidance point G, determines whether to transmit the guidance information on the warning event that has occurred in the concentrated section C including the guidance point G to the request vehicle.

Further, the case in which the request vehicle travels in front of the guidance point G corresponds that the guidance point G is in a forward section provided ahead of the request vehicle. Here, the forward section is a section from the current position to a position by a predetermined distance (for example, 500 m) ahead of the current position in the travel road section. Note that, in a case in which an intersection at an end point of the travel road section exists before the position by the predetermined distance from the current position, the control unit 20 may acquire, as the forward section, a section within the predetermined distance from the current position ahead on an expected travel route or a route along roads from the current position. The expected travel route is a route to a destination calculated in a known route calculation method. The route along roads may be a route in which an amount of change in a travel direction at an intersection at an end point of the travel road section is less than or equal to a threshold value and may be a route composed by road sections with the same line or the same size (the number of lanes, width, etc.) as the travel road section.

The control unit 20, with the function of the guidance control section 21c, in a case in which the guidance point G is in the forward section of the request vehicle, determines whether the identification information of the guidance target vehicle is associated with the guidance point G in the guidance point information 30c. In a case in which it is not determined that the identification information of the guidance target vehicle is associated with the guidance point G, the control unit 20 creates the guidance information indicating the guidance content associated with the guidance point G and transmits the created guidance information to the request vehicle. Here, as shown in Table 1, in a case in which the warning event with the same content that has occurred the threshold value of times or more in the concentrated section C has occurred on a plurality of event vehicles, the identification information of the guidance target vehicle is not associated with the guidance point G set in the concentrated section C in the guidance point information 30c (Case 2 in Table 1). Consequently, in a case in which the warning event that has occurred a plurality of times (greater than or equal to a threshold value) in the concentrated section C has occurred on a plurality of event vehicles, the control unit 20 may control to provide guidance at all of the request vehicles traveling in the concentrated section C.

In addition, in a case in which the warning event with the same content that has occurred the threshold value of times or more in the concentrated section C has occurred on the single event vehicle for all of the times, but the guidance point G is not within the predetermined distance Y from the driver's home X of the single event vehicle, not within the predetermined distance Y from the driver's work location V of the event vehicle, and not on the route frequently traveled by the event vehicle, the identification information of the guidance target vehicle is not associated with the guidance point G set inside the concentrated section C in the guidance point information 30c (Case 3 in Table 1). Consequently, in a case in which the warning event with the same content that has occurred the threshold value of times or more in the concentrated section C has occurred on the single event vehicle for all of the times, but the guidance point G is not within the predetermined distance Y from the driver's home X of the single event vehicle, not within the predetermined distance Y from the driver's work location V of the event vehicle, and not on the route frequently traveled by the event vehicle, the control unit 20 may control to provide guidance at all of the request vehicles traveling in the concentrated section C.

On the other hand, in a case in which it is determined that the identification information of the guidance target vehicle is associated with the guidance point G, the control unit 20, with the function of the guidance control section 21*c*, does not transmit the guidance information indicating the guidance content associated with the guidance point G to the request vehicle. Here, as shown in Table 1, the warning event with the same content that has occurred the threshold value of times or more in the concentrated section C has occurred on the single event vehicle for all of the times, and the concentrated section C is within the predetermined distance Y from the driver's home X or work location V of the single event vehicle (guidance target vehicle) or on the frequently traveled route R, the identification information of the guidance target vehicle is associated with the guidance point G in the guidance point information 30*c* (Case 1 in Table 1). Consequently, in a case in which the warning event with the same content that has occurred the threshold value of times or more in the concentrated section C has occurred on the single event vehicle for all of the times and the concentrated section C is within the predetermined distance Y from the driver's home X or work location V of the single event vehicle, the control unit 20 may basically control not to provide guidance at the request vehicle traveling in the concentrated section C. In the same manner, also in a case in which the warning event with the same content that has occurred the threshold value of times or more in the concentrated section C has occurred on the single event vehicle for all of the times and the concentrated section C is on the route R frequently traveled by the single event vehicle, the control unit 20 may basically control not to provide guidance at the request vehicle traveling in the concentrated section C.

However, in a case in which the warning event that has occurred a plurality of times in the predetermined section has occurred on the single warning vehicle for all of the plurality of times, the control unit 20, with the function of the guidance control section 21*c*, controls to provide guidance at the single event vehicle traveling in the predetermined section. That is, in a case in which the request vehicle traveling in front of the guidance point G is the guidance target vehicle, the control unit 20 controls to provide guidance at the request vehicle as the guidance target vehicle as an exception. Specifically, the control unit 20, with the function of the guidance control section 21*c*, determines whether the identification information of the request vehicle is the same as the identification information of the guidance target vehicle. In a case in which the identification information of the request vehicle is the same as the identification information of the guidance target vehicle, the control unit 20 creates the guidance information indicating the guidance content associated with the guidance point G and transmits the guidance information to the request vehicle (Case 5 in Table 1). On the other hand, in a case in which the identification information of the request vehicle is different from the identification information of the guidance target vehicle, the control unit 20 basically does not transmit the guidance information indicating the guidance content associated with the guidance point G to the request vehicle (Case 4 in Table 1).

At the request vehicle that has received the guidance information, the user I/F unit 460 is capable of outputting the audio message indicating the guidance content corresponding to the warning event. Naturally, at the request vehicle that has not received the guidance information, the user I/F unit 460 does not output the audio message indicating the guidance content corresponding to the warning event. Note that the user I/F unit 460 of the request vehicle is only necessary to provide the guidance on the warning event before the request vehicle travels through the guidance point G. For example, the request vehicle is only necessary to start the guidance at a point by a predetermined distance in front of the guidance point G.

In the present embodiment as explained above, in a case in which the warning event that has occurred a plurality of times in the concentrated section C has occurred on a single event vehicle (guidance target vehicle) for all of the plurality of times, it is difficult to say that the warning event is highly likely to occur on the request vehicle other than the guidance target vehicle. Consequently, it is possible to prevent the guidance from being unnecessarily provided by controlling not to provide the guidance with respect to the request vehicle other than the guidance target vehicle on which the warning event is not highly likely to occur. As an exception, in a case in which the warning event that has occurred a plurality of times in the concentrated section C has occurred on the guidance target vehicle for all of the plurality of times, the guidance is controlled to be provided at the guidance target vehicle traveling in the concentrated section C. In a case in which the warning event that has occurred a plurality of times in the concentrated section C has occurred on the guidance target vehicle for all of the plurality of times, the warning event is highly likely to occur on the guidance target vehicle. Consequently, it is possible to prevent the warning event from occurring by controlling to provide the guidance at the guidance target vehicle.

In addition, in a case in which the concentrated section C is within the predetermined distance Y from the driver's home or work location of the guidance target vehicle, it is possible to judge that the warning event may have occurred because the driver was distracted in traveling on a familiar road. In such a case, it is possible to assume that the warning event is less likely to occur with another driver who pays usual attention. Consequently, it is possible not to provide the guidance with respect to another vehicle on which the warning event is less likely to occur. In a case in which the guidance point G is on a route that has been traveled by the guidance target vehicle a predetermined number of times or more in the past, it is possible to judge that the warning event may have occurred because the driver was distracted in traveling on a familiar road. In such a case, it is possible to assume that the warning event is less likely to occur with another driver who pays usual attention. Consequently, it is possible not to provide the guidance with respect to another vehicle on which the warning event is less likely to occur.

(2) Warning Event Information Transmission Process

Figure 3B:
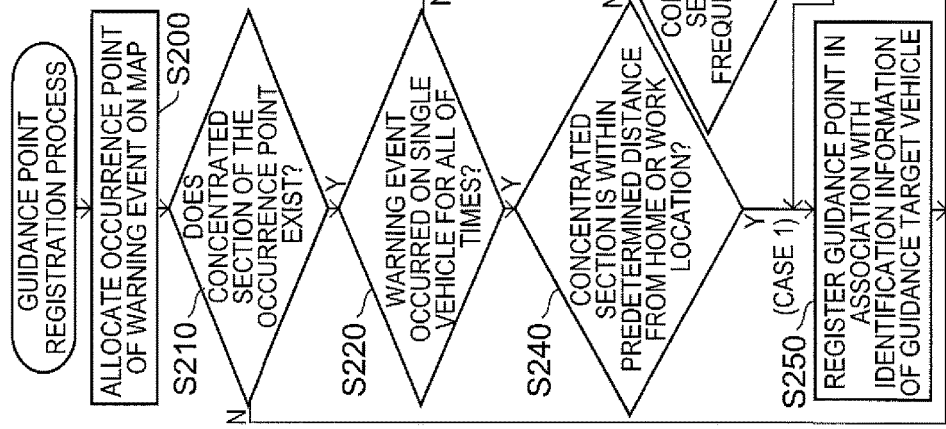
FIG. 3B is a flow chart of a guidance point registration process.
Figure 3A:
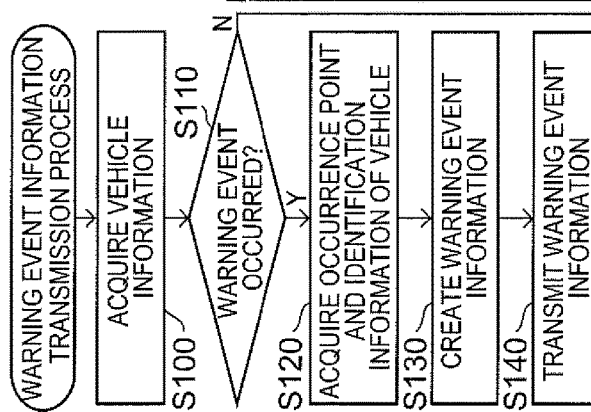
FIG. 3A is a flow chart of a warning event information transmission process.

Subsequently, a warning event information transmission process to be executed at a vehicle is explained. FIG. 3A is a flow chart of the warning event information transmission process. The warning event information transmission process is a process to be executed with a cycle of a predetermined time or travel distance. Initially, the control unit 200 of the navigation terminal 100 acquires vehicle information (Step S100). The vehicle information is information that can be derived from signals output from the respective sensors 410 to 450 and the ECU 440. That is, the vehicle information is information for the control unit 200 detecting occurrence of each warning event.

Next, the control unit 200, with the function of the warning event information transmission section 210*a*, determines whether a warning event has occurred on the vehicle (Step S110). That is, the control unit 200 determines based on the vehicle information whether any one of warning events has occurred.

In a case in which it is not determined that the warning event has occurred on the vehicle (Step S110: N), the control unit 200 returns to the beginning (Step S100) of the warning event information transmission process. That is, the control unit 200 waits until the vehicle information is acquired at the next cycle.

On the other hand, in a case in which the warning event has occurred on the vehicle (Step S110: Y), the control unit 200 acquires the content, the occurrence point, and the occurrence time of the warning event and the identification information of the host vehicle (the event vehicle on which the warning event has occurred) (Step S120).

Subsequently, the control unit 200, with the function of the warning event information transmission section 210*a*, creates the warning event information (Step S130). The warning event information is information indicating the content, the occurrence point, and the occurrence time of the warning event and the identification information of the host vehicle acquired at Step S120. Subsequently, the control unit 200, with the function of the warning event information transmission section 210*a*, transmits the warning event information to the warning guidance system 10 (Step S140). The warning event information transmission process as explained above is executed at each vehicle traveling on a road, thereby the warning guidance system 10 is capable of collecting the warning event information.

(3) Guidance Point Registration Process

Subsequently, a guidance point registration process to be executed by the warning guidance system 10 is explained. FIG. 3B is a flow chart of the guidance point registration process. For example, the guidance point registration process may be executed in a case in which an amount of the warning event information accumulated in the warning event information DB 30*b* becomes greater than or equal to a predetermined amount. Initially, the control unit 20, with the function of the guidance point registration section 21*b*, allocates occurrence points H of the warning event indicated in the warning event information accumulated in the warning event information DB 30*b* on the map shown by the map information 30*a* (Step S200). The control unit 200, with the function of the guidance point registration section 21*b*, determines whether the concentrated section C of the occurrence points H exists (Step S210). The concentrated section C of the occurrence points H is a section whose section length is a predetermined length (for example, 50 m) and in which the number of times of occurrence of the warning event with the same content is greater than or equal to a threshold value (for example, 5 times).

In a case in which it is not determined that the concentrated section C of the occurrence points H exists (Step S210: N), the control unit 20, with the function of the guidance point registration section 21*b*, terminates the guidance point registration process. That is, it is regarded that there is not a point at which the guidance on a warning event should be provided and the process terminates without registering the guidance point G.

On the other hand, in a case in which it is determined that the concentrated section C of the occurrence points H exists (Step S210: Y), the control unit 20, with the function of the guidance point registration section 21*b*, determines whether the warning event with the same content that has occurred the threshold value of times or more in the concentrated section C has occurred on a single event vehicle for all of the times (Step S220). That is, the control unit 20 acquires the identification information of the event vehicle associated with each time of the warning event with the same content that has occurred the threshold value of times or more in the concentrated section C and determines whether all pieces of the identification information of the event vehicles are the same.

In a case in which it is not determined that the warning event with the same content that has occurred the threshold value of times or more in the concentrated section C has occurred on the single event vehicle for all of the times (Step S220: N), the control unit 20, with the function of the guidance point registration section 21*b*, registers the guidance point G in the guidance point information 30*c* without associating the identification information of the guidance target vehicle (Step S230). That is, in a case in which the warning event with the same content that has occurred the threshold value of times or more in the concentrated section C has occurred on a plurality of event vehicles, the control unit 20 does not associate the identification information of the guidance target vehicle with the guidance point G (Case 2 in Table 1). In addition, the control unit 20 registers the guidance content corresponding to the warning event with the same content that has occurred the threshold value of times or more in the concentrated section C in association with the guidance point G in the guidance point information 30*c*.

On the other hand, in a case in which it is determined that the warning event with the same content that has occurred the threshold value of times or more in the concentrated section C has occurred on the single event vehicle for all of the times (Step S220: Y), the control unit 20, with the function of the guidance point registration section 21*b*, determines whether the concentrated section C is within the predetermined distance Y (for example, 1 km) from the driver's home X or work location V of the single event vehicle (Step S240). In a case in which, it is determined that the concentrated section C is within the predetermined distance Y (for example, 1 km) from the driver's home X or work location V of the single event vehicle (Step S240: Y), the control unit 20, with the function of the guidance point registration section 21*b*, registers the guidance point G in association with the identification information of the guidance target vehicle in the guidance point information 30*c* (Step S250). That is, the control unit 20 sets, as the guidance target vehicle, the single event vehicle on which the warning event with the same content that has occurred the threshold value of times or more in the concentrated section C and associates the identification information of the guidance target vehicle with the guidance point G (Case 1 in Table 1).

In a case in which it is not determined that the concentrated section C is within the predetermined distance Y from the driver's home X or work location V of the single event vehicle (Step S240: N), the control unit 20, with the function of the guidance point registration section 21*b*, determines whether the concentrated section C is on the route R frequently traveled by the single event vehicle (Step S260).

In a case in which it is determined that the concentrated section C is on the route R frequently traveled by the single event vehicle (Step S260: Y), the control unit 20, with the function of the guidance point registration section 21b, registers the guidance point G in association with the identification info illation of the guidance target vehicle in the guidance point information 30c (Step S250). That is, even in a case in which the concentrated section C is on the route R frequently traveled by the single event vehicle, the control unit 20 associates the identification information of the guidance target vehicle with the guidance point G in the same manner as a case in which the concentrated section C is within the predetermined distance Y from the driver's home X or work location V of the single event vehicle (Case 1 in Table 1).

On the other hand, in a case in which it is not determined that the concentrated section C is on the route R frequently traveled by the single event vehicle (Step S260: N), the control unit 20, with the function of the guidance point registration section 21b, registers the guidance point G in the guidance point information 30c without associating the identification information of the guidance target vehicle (Step S230). That is, in a case in which the concentrated section C is neither within the predetermined distance Y from the driver's home X or work location V of the single event vehicle nor on the route R frequently traveled by the single event vehicle, the control unit 20 does not associate the identification information of the guidance target vehicle with the guidance point G (Case 3 in Table 1).

(4) Warning Guidance Process

Next, a warning guidance process to be executed by the warning guidance system 10 is explained. FIG. 3C is a flow chart of the warning guidance process. The warning guidance process is a process to be executed in a case in which an acquisition request of the guidance information is received from the navigation terminal 100 of a request vehicle. To the acquisition request, the identification information of the request vehicle and the information indicating the travel road section being traveled by the request vehicle and the current position is attached. The warning guidance system 10 executes the warning guidance process to transmit the guidance information corresponding to the warning event that has occurred ahead of the current position in the travel road section in response to the acquisition request.

Initially, the control unit 20 of the warning guidance system 10 receives the acquisition request of the guidance information (Step S300). Subsequently, the control unit 20, with the function of the warning event information acquisition section 21a, determines whether the guidance point G is in the forward section of the request vehicle (Step S320). The forward section is a section from the current position of the request vehicle to a position by a predetermined distance (for example, 500 m) ahead of the current position of the request vehicle in the travel road section. Note that the control unit 20 is capable of determining whether the guidance point G is in the forward section of the request vehicle by referring to the guidance point information 30c.

In a case in which it is not determined that the guidance point G is in the forward section of the request vehicle (Step S320: N), the control unit 20, with the function of the guidance control section 21c, terminates the warning guidance process. That is, the control unit 20 controls not to provide the guidance on the warning event at the request vehicle under the assumption that the guidance point G to provide the guidance on the warning event is not in the forward section of the request vehicle. In the present embodiment, in a case in which the number of times that the warning event with the same content has occurred in the concentrated section C is greater than or equal to the threshold value (for example, 5 times), the guidance point G is registered. Therefore, it is possible to prevent the guidance on the warning event from being provided at the request vehicle traveling through a point at which the warning event with the same content has occurred a few times.

In a case in which it is determined that the guidance point G is in the forward section of the request vehicle (Step S320: Y), the control unit 20, with the function of the guidance control section 21c, determines whether the guidance point G is associated with the identification information of the guidance target vehicle (Step S330). That is, the control unit 20 determines whether the guidance point G (concentrated section C) existing in the forward section of the request vehicle corresponds to Case 1 in Table 1. That is, the control unit 20 determines whether the warning event with the same content that has occurred the threshold value of times or more in the concentrated section C, in which the guidance point G existing in the forward section of the request vehicle is set, has occurred on a single event vehicle for all of the times, and the concentrated section C is within the predetermined distance Y from the driver's home X or work location V of the single event vehicle or the concentrated section C is on the route R frequently traveled by the single event vehicle.

In a case in which it is determined that the guidance point G is not associated with the identification information of the guidance target vehicle (Step S330: N), the control unit 20, with the function of the guidance control section 21c, transmits the guidance information to the request vehicle (Step S340). That is, the control unit 20 creates the guidance information indicating the guidance content associated with the guidance point G in the guidance point information 30c and transmits the guidance information to the request vehicle. The guidance content associated with the guidance point G is the guidance content corresponding to the warning event with the same content that has occurred the threshold value of times or more in the concentrated section C. For example, the guidance content is the content of an audio message that notifies that the warning event is likely to occur at the guidance point G or provides guidance on a driving operation to prevent the warning event. At the request vehicle that has received the guidance information, the user I/F unit 460 is capable of outputting the audio message indicating the guidance content corresponding to the warning event.

On the other hand, in a case in which it is determined that the guidance point G is associated with the identification information of the guidance target vehicle (Step S330: Y), the control unit 20, with the function of the guidance control section 21c, determines whether the guidance target vehicle is the same as the request vehicle (Step S350). That is, the control unit 20 determines whether the identification information of the guidance target vehicle associated with the guidance point G is the same as the identification information of the request vehicle. In a case in which the guidance target vehicle is the same as the request vehicle, the event vehicle on which the warning event with the same content has occurred the threshold value of times or more in the concentrated section C, in which the guidance point G is set, is the request vehicle itself.

Here, in a case in which it is determined that the guidance target vehicle is the same as the request vehicle (Step S350: Y), the control unit 20, with the function of the guidance control section 21c, transmits the guidance information to the request vehicle (Step S340). Thereby, it is possible to transmit the guidance information to provide the guidance on the warning event with respect to the request vehicle on which the warning event with the same content that has occurred the threshold value of times or more in the concentrated section C in which the guidance point G is set, that is, the request vehicle on which the same warning event is highly likely to occur (Case 5 in Table 1). The user I/F unit 460 is capable of outputting the audio message indicating the guidance content corresponding to the warning event at the request vehicle that has received the guidance information.

On the other hand, in a case in which it is not determined that the guidance target vehicle is the same as the request vehicle (Step S350: N), the control unit 20, with the function of the guidance control section 21c, terminates the warning guidance process. That is, the control unit 20 terminates the warning guidance process without transmitting the guidance information to the request vehicle and controls not to provide the guidance on the warning event at the request vehicle (Case 4 in Table 1). Thereby, in a case in which the warning event with the same content that has occurred the threshold value of times or more in the concentrated section C, in which the guidance point G existing in the forward section of the request vehicle is set, has occurred on another vehicle (guidance target vehicle) that is different from the request vehicle, and the concentrated section C is within the predetermined distance Y from the driver's home X or work location V of the single event vehicle or the concentrated section C is on the route R frequently traveled by the single event vehicle, the control unit 20 is capable of controlling not to provide the guidance on the warning event at the request vehicle.

(5) Other Embodiments

In a case in which the warning event with the same content that has occurred the threshold value of times or more in the concentrated section C has occurred on a single event vehicle, the control unit 20, with the function of the guidance control section 21c, may set the single event vehicle as the guidance target vehicle regardless of whether the concentrated section C is on the route R frequently traveled by the single event vehicle. In the same manner, in a case in which the warning event with the same content that has occurred the threshold value of times or more in the concentrated section C has occurred on a single event vehicle, the control unit 20 may set the single event vehicle as the guidance target vehicle regardless of whether the concentrated section C is within the predetermined distance Y from the driver's home X or work location V of the single event vehicle or whether the concentrated section C is on the route R frequently traveled by the single event vehicle. That is, Step S240 and S260 in the guidance point registration process (FIG. 3B) may be skipped.

In addition, in a case in which the warning event with the same content that has occurred the threshold value of times or more in the concentrated section C has occurred on a single event vehicle, the control unit 20, with the function of the guidance control section 21c, may control not to provide the guidance on the warning event at the single event vehicle.

The above embodiments are examples. Therefore, other kinds of embodiments may be adapted. Warning event information acquisition means is only necessary to acquire the warning event information indicating the warning event and the event vehicle. The warning event information acquisition means may receive the warning event information from vehicles or acquire the warning event information from storage media in which the warning event information is accumulated. In addition, the warning event information acquisition means is only necessary to acquire the warning event information from event vehicles on which the warning event has occurred a plurality of times. In addition, the warning event information is only necessary to be information indicating at least the warning event (content of the warning event) and the event vehicle (identification information of the vehicle). The warning event information may include other information (occurrence point, occurrence time, level of warning event, etc) of the warning event. The warning event may be an event that can occur relating to vehicles. The warning event may be an event in which the state (operation status, driving status, etc.) of the vehicle becomes in a predetermined state, or an event in which the state (road shape, obstacle, weather, congestion, etc.) of the environment of the area being traveled by the vehicle becomes in a predetermined state. The predetermined state may be a state in which a state value (amount of depressing of brake pedal, opening degree of throttle, steering angle, vehicle speed, acceleration, etc.) indicating the state of the vehicle or a state value (curvature radius of road, temperature, congestion degree, etc.) indicating the state of environment becomes less than or equal to a predetermined threshold value or becomes greater than or equal to the predetermined threshold value.

Guidance control means is only necessary to, in a case in which the warning event that has occurred a plurality of times in the predetermined section has occurred on a plurality of event vehicles, control to provide guidance at a vehicle traveling in the predetermined section. The guidance control means is only necessary to control to provide guidance to notify that the warning event is likely to occur or guidance to prevent a warning event. On the other hand, the guidance control means is only necessary to, in a case in which the warning event that has occurred a plurality of times in the predetermined section has occurred on a single event vehicle, control not to provide guidance at another vehicle traveling in the predetermined section, that is, the guidance control means is only necessary to control not to provide guidance at a vehicle.

Here, the warning guidance system may be a server communicably connected to an in-vehicle terminal mounted in a vehicle. That is, the warning event information acquisition means may be provided in the server and may acquire the warning event information indicating the warning event and the event vehicle on which the warning event has occurred from the in-vehicle terminal. In addition, the guidance control means may be provided in the server, in a case in which the warning event that has occurred a plurality of times in the predetermined section has occurred on a plurality of vehicles, may control to provide guidance at a vehicle traveling in the predetermined section, and in a case in which the warning event that has occurred a plurality of times in the predetermined section has occurred on a single event vehicle for all of the plurality of times, may control not to provide the guidance at another vehicle traveling in the predetermined section. Obviously, the warning event information acquisition means and the guidance control means may be provided in the in-vehicle terminal, or the warning event information acquisition means and the guidance control means may be provided in the in-vehicle terminal and the server separately.

Here, in a case in which the warning event that has occurred a plurality of times in the predetermined section has occurred on a single event vehicle for all of the plurality of times, the guidance control means may control to provide guidance at the single event vehicle traveling in the predetermined section. In a case in which the warning event that has occurred a plurality of times in the predetermined section has occurred on the single event vehicle for all of the plurality of times, the warning event is likely to occur on the single event vehicle. Consequently, the guidance is provided at the single event vehicle, thereby it is possible to prevent the warning event from occurring.

Further, in a case in which the warning event that has occurred a plurality of times in the predetermined section has occurred on a single event vehicle for all of the plurality of times and the predetermined section is within a predetermined distance from the driver's home or work location of the single event vehicle, the guidance control means may control not to provide the guidance at another vehicle traveling in the predetermined section. In a case in which the predetermined section is within the predetermined distance from the driver's home or work location of the single event vehicle, it is possible to judge that the warning event has occurred because the driver was distracted in traveling on a familiar road. In such a case, it is possible to assume that the warning event is less likely to occur with another driver who pays usual attention. Consequently, it is possible not to provide the guidance with respect to another vehicle on which the warning event is less likely to occur.

In addition, in a case in which the warning event that has occurred a plurality of times in the predetermined section has occurred on a single event vehicle for all of the plurality of times and the predetermined section is on a route traveled by the single event vehicle a predetermined number of times or more in the past, the guidance control means may control not to provide guidance at another vehicle traveling in the predetermined section. In a case in which the predetermined section is on the route traveled by the single event vehicle the predetermined number of times or more in the past, it is possible to judge that the warning event may have occurred because the driver was distracted in traveling on a familiar road. In such a case, it is possible to assume that the warning event is less likely to occur with another driver who pays usual attention. Consequently, it is possible to control not to provide the guidance with respect to another vehicle on which the warning event is less likely to occur.

Further, the technique of providing guidance on a warning event can be applied to a program and a method. In addition, it can be supposed that the system, the program, and the method as mentioned above are realized as a single device, or realized with parts used in common by the respective components provided in the vehicle. Various kinds of modes are included. For example, navigation systems, administration systems of travel history information, methods, and programs provided with the aforementioned devices can be supplied. Or, the structure can be changed as appropriate. For example, a part of the structure can be realized by software and another part by hardware. In addition, embodiments can be practiced with a storage medium of a program that controls the system. Obviously, the storage medium of the software may be a magnetic storage medium or an optical storage medium. In addition, any storage medium to be developed in future can be applied in the same manner.

The invention claimed is:

1. A warning guidance system for communicating with a vehicle navigation system to provide guidance on a warning event that may occur on the vehicle, the warning guidance system comprising:
   a memory storing warning event information of a plurality of event vehicles; and
   a processor operatively coupled to the memory, the processor being programmed to:
      receive a guidance acquisition request requesting guidance information;
      acquire warning event information indicating the warning event and an event vehicle on which the warning event occurred, and store the warning event information in the memory;
      determine whether the warning event occurred a plurality of times in a predetermined location on the plurality of event vehicles;
      responsive to determining that the warning event occurred the plurality of times in the predetermined location on the plurality of event vehicles, transmit the guidance information to each vehicle, from which the guidance request is received, traveling in the predetermined location; and
      responsive to determining that the warning event occurred the plurality of times in the predetermined location on only the event vehicle of the plurality of event vehicles, transmit the guidance information only to the event vehicle upon receiving the guidance acquisition request from the event vehicle, wherein the transmitted guidance information is configured to cause the vehicle navigation system of each vehicle to output guidance based on the guidance information.

2. The warning guidance system according to claim 1, wherein the processor is programmed to:
   transmit the guidance information to the event vehicle traveling in the predetermined location in a case in which the warning event that has occurred the plurality of times in the predetermined location has occurred on the event vehicle for all of the plurality of times.

3. The warning guidance system according to claim 1, wherein the processor is programmed to:
   not transmit the guidance information to any other vehicle traveling in the predetermined location in a case in which:
      the warning event that has occurred the plurality of times in the predetermined location has occurred on the event vehicle for all of the plurality of times; and
      the predetermined location is within a predetermined distance from a home or a work location of a driver of the event vehicle.

4. The warning guidance system according to claim 1, wherein the processor is programmed to:
   not transmit the guidance information to any other vehicle traveling in the predetermined location in a case in which:
      the warning event that has occurred the plurality of times in the predetermined location has occurred on the event vehicle for all of the plurality of times; and
      the predetermined location is on a route traveled by the event vehicle a predetermined number of times or more in a past.

5. The warning guidance system according to claim 1, wherein:
   the warning event is an event in which a state value indicating a state of the event vehicle or a state of an environment of the event vehicle becomes greater than or equal to a threshold value or less than or equal to the threshold value.

6. A warning guidance method for communicating with a vehicle navigation system to provide guidance on a warning event that may occur on the vehicle, the warning guidance method comprising:
- receiving, by a processor, a guidance acquisition request requesting guidance information;
- acquiring warning event information indicating the warning event and an event vehicle on which the warning event occurred, and storing the warning event information in a memory;
- determining whether the warning event occurred a plurality of times in a predetermined location on the plurality of event vehicles;
- responsive to determining that the warning event occurred the plurality of times in the predetermined location on the plurality of event vehicles, transmitting the guidance information to each vehicle, from which the guidance request is received, traveling in the predetermined location; and
- responsive to determining that the warning event occurred the plurality of times in the predetermined location on only the event vehicle of the plurality of event vehicles, transmitting guidance information only to the event vehicle upon receiving the guidance acquisition request from the event vehicle, wherein the transmitted guidance information is configured to cause the vehicle navigation system of each vehicle to output guidance based on the guidance information.

7. A non-transitory computer-readable storage medium storing a computer-executable warning guidance program for communicating with a vehicle navigation system to provide guidance on a warning event that may occur on the vehicle, the warning guidance program causing a computer to execute the following functions:
- receiving a guidance acquisition request requesting guidance information;
- acquiring warning event information indicating the warning event and an event vehicle on which the warning event occurred, and storing the warning event information in a memory;
- determining whether the warning event occurred a plurality of times in a predetermined location on the plurality of event vehicles;
- responsive to determining that the warning event occurred the plurality of times in the predetermined location on the plurality of event vehicles, transmitting the guidance information to each vehicle, from which the guidance request is received, traveling in the predetermined location; and
- responsive to determining that the warning event occurred the plurality of times in the predetermined location on only the event vehicle of the plurality of event vehicles, transmitting guidance information only to the event vehicle upon receiving the guidance acquisition request from the event vehicle, wherein the transmitted guidance information is configured to cause the vehicle navigation system of each vehicle to output guidance based on the guidance information.

* * * * *